United States Patent
Wang et al.

(10) Patent No.: US 12,103,087 B2
(45) Date of Patent: Oct. 1, 2024

(54) SYSTEMS AND METHODS FOR PLATINUM NANOCATALYST SYNTHESIS VIA CONTINUOUS FLOW REACTOR

(71) Applicant: UCHICAGO ARGONNE, LLC, Chicago, IL (US)

(72) Inventors: Rongyue Wang, Naperville, IL (US); Krzysztof Z. Pupek, Plainfield, IL (US); Vojislav Stamenkovic, Naperville, IL (US); Trevor L. Dzwiniel, Carol Stream, IL (US)

(73) Assignee: UChicago Argonne, LLC, Chicago, IL (US)

( * ) Notice: Subject to any disclaimer, the term of this patent is extended or adjusted under 35 U.S.C. 154(b) by 404 days.

(21) Appl. No.: 16/587,507

(22) Filed: Sep. 30, 2019

(65) Prior Publication Data
US 2021/0094024 A1    Apr. 1, 2021

(51) Int. Cl.
*B01J 23/89* (2006.01)
*B22F 9/24* (2006.01)
*B22F 1/054* (2022.01)
*B82Y 30/00* (2011.01)

(52) U.S. Cl.
CPC .............. *B22F 9/24* (2013.01); *B01J 23/892* (2013.01); *B22F 1/054* (2022.01); *B22F 2301/25* (2013.01); *B22F 2998/10* (2013.01); *B82Y 30/00* (2013.01)

(58) Field of Classification Search
CPC ..... B01J 23/892; B22F 1/054; B22F 2301/25; B22F 2998/10; B22F 2999/00; B22F 9/24; B22F 1/145; B22F 1/142; B22F 1/17; B22F 2201/013; B22F 2201/11; B82Y 30/00; B82Y 40/00
See application file for complete search history.

(56) References Cited

U.S. PATENT DOCUMENTS

| | | |
|---|---|---|
| 5,879,827 A | 3/1999 | Debe et al. |
| 7,252,698 B2 | 8/2007 | Mirkin et al. |
| 7,622,217 B2 | 11/2009 | Debe et al. |
| 7,871,738 B2 | 1/2011 | Stamenkovic et al. |
| 8,178,463 B2 | 5/2012 | Stamenkovic et al. |
| 8,685,878 B2 | 4/2014 | Stamenkovic et al. |
| 9,246,177 B2 | 1/2016 | Stamenkovic et al. |
| 9,735,432 B2 | 8/2017 | Cho et al. |
| 10,099,207 B2 | 10/2018 | Stamenkovic et al. |

(Continued)

FOREIGN PATENT DOCUMENTS

| | | |
|---|---|---|
| CN | 105234427 A | 1/2016 |
| WO | WO-2011/112608 A1 | 9/2011 |
| WO | WO-2011/139705 A1 | 11/2011 |

OTHER PUBLICATIONS

Stamenkovic, V., and N. M. Markovic. "Tailored high performance low-PGM alloy cathode catalysts." 2018 DOE hydrogen and fuel cells program review (2018).*

(Continued)

*Primary Examiner* — Richard M Rump
(74) *Attorney, Agent, or Firm* — FOLEY & LARDNER LLP

(57) ABSTRACT

A method for synthesis of platinum nanoparticles by continuous flow using large flow segments. The nanoparticles are monodispersed and can undergo acid leaching to form platinum catalyst, such as PtNi or PtCo catalyst material.

16 Claims, 9 Drawing Sheets

(56) References Cited

U.S. PATENT DOCUMENTS

| | | |
|---|---|---|
| 2002/0194958 A1 | 12/2002 | Lee et al. |
| 2004/0072061 A1 | 4/2004 | Nakano et al. |
| 2006/0083970 A1 | 4/2006 | Shibutani et al. |
| 2009/0247400 A1 | 10/2009 | Stamenkovic et al. |
| 2010/0008840 A1 | 1/2010 | Zhong et al. |
| 2010/0086832 A1 | 4/2010 | Lopez et al. |
| 2010/0092841 A1 | 4/2010 | Lopez et al. |
| 2010/0105548 A1 | 4/2010 | Zhang et al. |
| 2010/0197490 A1 | 8/2010 | Adzic et al. |
| 2011/0077147 A1 | 3/2011 | Stamenkovic et al. |
| 2011/0159365 A1 | 6/2011 | Loveness et al. |
| 2011/0167962 A1 | 7/2011 | Ghanavi et al. |
| 2011/0189589 A1 | 8/2011 | Erlebacher et al. |
| 2011/0207019 A1 | 8/2011 | Mukerjee |
| 2013/0053239 A1 | 2/2013 | Carpenter |
| 2013/0085061 A1 | 4/2013 | Stamenkovic et al. |
| 2013/0133483 A1 | 5/2013 | Yang et al. |
| 2013/0178357 A1 | 7/2013 | Adzic et al. |
| 2015/0017570 A1 | 1/2015 | Yang et al. |
| 2015/0132683 A1 | 5/2015 | Shirvanian |
| 2015/0236355 A1 | 8/2015 | Yang et al. |
| 2016/0233516 A1 | 8/2016 | Nakamura et al. |
| 2016/0288102 A1* | 10/2016 | Stamenkovic ............ B01J 37/08 |
| 2018/0281060 A1 | 10/2018 | Yang et al. |
| 2019/0379059 A1 | 12/2019 | Stamenkovic et al. |

OTHER PUBLICATIONS

Niu, Guangda, et al. "Supporting Information for: Synthesis of Pt—Ni octahedra in continuous-flow droplet reactors for the scalable production of highly active catalysts toward oxygen reduction." Nano letters 16.6 (2016): S1-S13.*
Li, Shaowei, et al. "Controllable preparation of nanoparticles by drops and plugs flow in a microchannel device." Langmuir 24.8 (2008): 4194-4199.*
Mokari, Taleb. "Synthesis and characterization of hybrid nanostructures." Nano reviews 2.1 (2011): 5983.*
Miao, Hui, et al. "Synthesis of PtCo nanoflowers and its catalytic activity towards nitrobenzene hydrogenation." Catalysis Communications 109 (2018): 33-37.*
"A matter of scale," Nature Nanotechnology 11, p. 773 (2016).
Ahrenstorf, et al., "Colloidal Synthesis of NixPt1-x Nanoparticles with Tuneable Composition and Size," Small 3(2), pp. 271-274 (2007).
Armstrong, et al., "Evaluating the performance of nanostructured materials as lithium-ion battery electrodes," Nano Research 7(1), pp. 1-62 (2014).
Banham & Ye, "Current Status and Future Development of Catalyst Materials and Catalyst Layers for Proton Exchange Membrane Fuel Cells: An Industrial Perspective," ACS Energy Letters 2(3), pp. 629-638 (2017).
Baskes & Johnson, "Modified embedded atom potentials for HCP metals," Modelling and Simulation in Materials Science and Engineering 2, pp. 147-163 (1994).
Baskes, "Modified embedded-atom potentials for cubic materials and impurities," Physical Review B 46(5), pp. 2727-2742 (1992).
Cargnello, et al., "Control of Metal Nanocrystal Size Reveals Metal-Support Interface Role for Ceria Catalysts," Science 341(6147), pp. 771-773 (2013).
Chadi & Cohen, "Special Points in the Brillouin Zone," Physical Review 8(12), pp. 5747-5753 (1973).
Chen, et al., "Highly Crystalline Multimetallic Nanoframes with Three-Dimensional Electrocatalytic Surfaces," Science 343(6177), pp. 1339-1343 (2014).
Choi, et al., "Gram-scale synthesis of highly active and durable octahedral PtNi nanoparticle catalysts for proton exchange membrane fuel cell," Applied Catalysis B: Environmental 225, pp. 530-537 (2018).
Cui, et al., "Compositional segregation in shaped Pt alloy nanoparticles and their structural behavior during electrocatalysis," Nature Materials 12, pp. 765-771 (2013).
Dahmani, et al., "Ni-Pt Phase Diagram: Experiment and Theory," Physical Review Letters 55(11), pp. 1208-1211 (1985).
Davis, "Ordered porous materials for emerging applications," Nature 417, pp. 813-821 (2002).
Debe, "Electrocatalyst approaches and challenges for automotive fuel cells," Nature 486, pp. 43-51 (2012).
Dubau, et al., "Tuning the Performance and the Stability of Porous Hollow PtNi/C Nanostructures for the Oxygen Reduction Reaction," ACS Catalysis 5(9), pp. 5333-5341 (2015).
Erlebacher, et al., "Evolution of nanoporosity in dealloying," Nature 410, pp. 450-453 (2001).
Ferreira, et al., "Instability of Pt/C Electrocatalysts in Proton Exchange Membrane Fuel Cells: A Mechanistic Investigation," Journal of the Electrochemical Society 152(11), pp. A2256-A2271 (2005).
Fu, et al., "Three-dimensional PtNi hollow nanochains as an enhanced electrocatalyst for the oxygen reduction reaction," Journal of Materials Chemistry A 4, pp. 8755-8761 (2016).
Gasteiger, et al.,. "Activity benchmarks and requirements for Pt, Pt-alloy, and non-Pt oxygen reduction catalysts for PEMFCs," Applied Catalysis B: Environmental 56(1-2), pp. 9-35 (2005).
Grass, et al., "New ambient pressure photoemission endstation at Advanced Light Source beamline 9.3.2," Review of Scientific Instruments 81, 7 pages (2010).
Hammer, et al., "Improved adsorption energetics within density-functional theory using revised Perdew-Burke-Ernzerhof functionals," Physical Review B 59(11), pp. 7413-7421 (1999).
Han, et al., "Record activity and stability of dealloyed bimetallic catalysts for proton exchange membrane fuel cells," Energy & Environmental Science 8, pp. 258-266 (2015).
Jaco & Goddard, "Adsorption of Atomic H and O on the (111) Surface of Pt3Ni Alloys," The Journal of Physical Chemistry B 108(24), pp. 8311-8323 (2004).
Johnson, et al., "Ordered Mesoporous Polymers of Tunable Pore Size from Colloidal Silica Templates," Science 283(5404), pp. 963-965 (1999).
Kang, et al., "Heterogeneous Catalysts Need Not Be so 'Heterogeneous': Monodisperse Pt Nanocrystals by Combining Shape-Controlled Synthesis and Purification by Colloidal Recrystallization," Journal of the American Chemical Society 135(7), pp. 2741-2747 (2013).
Kirkland, et al., "Simulation of annular dark field stem images using a modified multislice method," Ultramicroscopy 23(1), pp. 77-96 (1987).
Klenov &Stemmer, "Contributions to the contrast in experimental high-angle annular dark-field images," Ultramicroscopy 106(10), pp. 889-901 (2006).
Koh & Strasser, "Electrocatalysis on Bimetallic Surfaces: Modifying Catalytic Reactivity for Oxygen Reduction by Voltammetric Surface Dealloying," Journal of the American Chemical Society 129(42), pp. 12624-12625 (2007).
Li, et al., "Surfactant Removal for Colloidal Nanoparticles from Solution Synthesis: The Effect on Catalytic Performance," ACS Catalysis 2(7), pp. 1358-1362 (2012).
Liu, et al., "Self-Terminating Growth of Platinum Films by Electrochemical Deposition," Science 338(6112), pp. 1327-1330 (2012).
Liu, et al., "Synthesis and activation of Pt nanoparticles with controlled size for fuel cell electrocatalysts," Journal of Power Sources 164(2), pp. 472-480 (2007).
Lohse, et al., "A Simple Millifluidic Benchtop Reactor System for the High-Throughput Synthesis and Functionalization of Gold Nanoparticles with Different Sizes and Shapes," ACS Nano 7(5), pp. 4135-4150 (2013).
Lopes, et al., "Relationships between Atomic Level Surface Structure and Stability/Activity of Platinum Surface Atoms in Aqueous Environments," ACS Catalysis, 6(4), pp. 2536-2544 (2016).
Macdonald, et al., "Hybrid Nanoscale Inorganic Cages," Nature Materials 9, pp. 810-815 (2010).
Mahmoud, et al., "Following Charge Separation on the Nanoscale in Cu2O-Au Nanoframe Hollow Nanoparticles," Nano Letters 11(8), pp. 3285-3289 (2011).

(56) References Cited

OTHER PUBLICATIONS

Nellit & Pennycook, "Incoherent imaging using dynamically scattered coherent electrons," Ultramicroscopy 78(1-4), pp. 111-124 (1999).
Niu & Li, "Removal and Utilization of Capping Agents in Nanocatalysis," Chemistry of Materials 26(1), pp. 72-83 (2014).
Niu, et al., "Toward continuous and scalable production of colloidal nanocrystals by switching from batch to droplet reactors," Chemical Society Reviews 44(16), pp. 5806-5820 (2015).
Oh, et al., "Galvanic Replacement Reactions in Metal Oxide Nanocrystals," Science 340(6135), pp. 964-968 (2013).
Oszajca, et al., "Precisely Engineered Colloidal Nanoparticles and Nanocrystals for Li-Ion and Na-Ion Batteries: Model Systems or Practical Solutions?," Chemistry of Materials 26(19), pp. 5422-5432 (2014).
Park & Xia, "Macroporous Membranes with Highly Ordered and Three-Dimensionally Interconnected Spherical Pores," Advanced Materials 10(13), pp. 1045-1048 (1998).
Perdew, et al., "Atoms, molecules, solids, and surfaces: Applications of the generalized gradient approximation for exchange and correlation," Physical Review B 46(11), pp. 6671-6687 (1992).
Pupek, "Continuous Flow Synthesis, a Platform to Accelerate the Transition of Nanomaterials to Manufacturing," Informatics, Electronics and Microsystems: TechConnect Briefs 2018, pp. 130-133 (2018).
Schlogl, et al., "Ambient Pressure Photoelectron Spectroscopy: A new tool for surface science and nanotechnology," Surface Science Reports 63(4), pp. 169-199 (2008).
Shao, et al., "Recent Advances in Electrocatalysts for Oxygen Reduction Reaction," Chemical Reviews 116(6), pp. 3594-3657 (2016).
Skrabalak, et al., "Gold Nanocages: Synthesis, Properties, and Applications," Accounts of Chemical Research 41(12), pp. 1587-1595 (2008).
Snyder, et al., "Oxygen reduction in nanoporous metal-ionic liquid composite electrocatalysts," Nature Materials 9, pp. 904-907 (2010).
Snyder, et al., "Structure/Processing/Properties Relationships in Nanoporous Nanoparticles As Applied to Catalysis of the Cathodic Oxygen Reduction Reaction," Journal of the American Chemical Society 132(20), pp. 8633-8645 (2012).
Snyder, et al., "Structure/Processing/Properties Relationships in Nanoporous Nanoparticles As Applied to Catalysis of the Cathodic Oxygen Reduction Reaction," Journal of the American Chemical Society 134(20), pp. 8633-8645 (2012).
Stamenkovic, et al., "Effect of Surface Composition on Electronic Structure, Stability, and Electrocatalytic Properties of Pt-Transition Metal Alloys: Pt-Skin versus Pt-Skeleton Surfaces," Journal of the American Chemical Society 128(27), pp. 8813-8819 (2006).
Stamenkovic, et al., "Improved Oxygen Reduction Activity on Pt3Ni(111) via Increased Surface Site Availability," Science 315(511), pp. 493-497 (2007).
Stamenkovic, et al., "Improved Oxygen Reduction Activity on Pt3Ni(111) via Increased Surface Site Availability," Science 315(5811), pp. 493-497 (2007).
Stamenkovic, et al., "Surface Composition Effects in Electrocatalysis: Kinetics of Oxygen Reduction on Well Defined Pt3Ni and Pt3Co Alloy Surfaces," Journal of Physical Chemistry B 106(46), pp. 11970-11979 (2002).
Stephens, et al., "Toward sustainable fuel cells," Science 354, pp. 1378-1379 (2016).
Strasser, "Catalysts by Platonic design," Science 349, pp. 379-380 (2015).
Subbaraman, et al., "Enhancing Hydrogen Evolution Activity in Water Splitting by Tailoring Li-Ni(OH)2-Pt Interfaces," Science 334, pp. 1256-1260 (2011).
Sun & Xia, "Shape-Controlled Synthesis of Gold and Silver Nanoparticles," Science 298, pp. 2176-2179 (2002).
Sun, et al., "Template-Engaged Replacement Reaction: A One-Step Approach to the Large-Scale Synthesis of Metal Nanostructures with Hollow Interiors," Nano Letters 2(5), pp. 481-485 (2002).

Tang, et al., "Electrochemical Stability of Nanometer-Scale Pt Particles in Acidic Environments," Journal of the American Chemical Society 132(2), pp. 596-600 (2010).
Tao, et al., "Reaction-Driven Restructuring of Rh-Pd and Pt-Pd Core-Shell Nanoparticles," Science 322(5903), pp. 939-934 (2008).
Tsao & Yang, "Continuous Production of Carbon-Supported Cubic and Octahedral Platinum-Based Catalysts Using Conveyor Transport System," Small 12(35), pp. 4808-4814 (2016).
US Office Action on U.S. Appl. No. 12/961,870, mail date Feb. 19, 2016, 11 pages.
Van Der Vliet, et al., "Mesostructured thin films as electrocatalysts with tunable composition and surface morphology," Nature Materials 11, pp. 1051-1058 (2012).
Van Der Vliet, et al., "Unique Electrochemical Adsorption Properties of Pt-Skin Surfaces," Angewandte Chemie 124(13), pp. 3193-3196 (2012).
Vanderbilt, "Soft self-consistent pseudopotentials in a generalized eigenvalue formalism," Physical Review B 41(11), pp. 7892-7895 (1990).
Wang & Li, et al., "Effective Octadecylamine System for Nanocrystal Synthesis," Inorganic Chemistry 50(11), pp. 5196-5202 (2011).
Wang et al., "Monodisperse Pt3Co Nanoparticles as a Catalyst for the Oxygen Reduction Reaction: Size-Dependent Activity," The Journal of Physical Chemistry C 113(45), pp. 19365-19368 (2009).
Wang, et al., "Design and Synthesis of Bimetallic Electrocatalyst with Multilayered Pt-Skin Surfaces," Journal of the American Chemical Society 133(36), pp. 14396-14403 (2011).
Wang, et al., "Kirkendall Effect and Lattice Contraction in Nanocatalysts: A New Strategy to Enhance Sustainable Activity," Journal of the American Chemical Society 133(34), pp. 13551-13557 (2011).
Wang, et al., "One-Pot Solution Synthesis of Cubic Cobalt Nanoskeletons," Advanced Materials 21(16), pp. 1636-1640 (2009).
Wang, et al., "Structurally ordered intermetallic platinum-cobalt core-shell nanoparticles with enhanced activity and stability as oxygen reduction electrocatalysts," Nature Materials 12, pp. 81-87 (2013).
Wu, et al., "Truncated Octahedral Pt3Ni Oxygen Reduction Reaction Electrocatalysts," Journal of the American Chemical Society 132(14), pp. 4984-4985 (2010).
Xia, et al.,. "Shape-Controlled Synthesis of Metal Nanocrystals: Simple Chemistry Meets Complex Physics," Angewandte Chemie 48(1), pp. 60-103 (2008).
Xin, et al., "Revealing the Atomic Restructuring of Pt-Co Nanoparticles," Nano Letters 14(6), pp. 3203-3207 (2014).
Yadavali, et al., "Silicon and glass very large scale microfluidic droplet integration for terascale generation of polymer microparticles," Nature Communications 9, 1222, 9 pages (2018).
Yavuz, et al., "Gold nanocages covered by smart polymers for controlled release with near-infrared light," Nature Materials 8, pp. 935-939 (2009).
Yin, et al., "Formation of Hollow Nanocrystals Through the Nanoscale Kirkendall Effect," Science 304(5671), pp. 711-714 (2004).
Zeng, et al., "A Comparison Study of the Catalytic Properties of Au-Based Nanocages, Nanoboxes, and Nanoparticles," Nano Letters 10(1), pp. 30-35 (2010).
Zhang & Xia, "Scaling up the Production of Colloidal Nanocrystals: Should We Increase or Decrease the Reaction Volume," Advanced Materials 26(16), pp. 2600-2606 (2014).
Zhang, et al., "A Generic Wet Impregnation Method for Preparing Substrate-Supported Platinum Group Metal and Alloy Nanoparticles with Controlled Particle Morphology," Nano Letters 16(1), pp. 164-169 (2016).
Zhang, et al., "Platinum-based nanocages with subnanometer-thick walls and well-defined, controllable facets," Science 349(6246), pp. 412-416 (2015).
Zhang, et al., "Platinum-based nanocages with subnanometer-thick walls and well-defined, controllable facets," Science 349(6246), pp. 412-416 (2016).
Zhang, et al., "Solid-State Chemistry-Enabled Scalable Production of Octahedral Pt-Ni Alloy Electrocatalyst for Oxygen Reduction Reaction," Journal of the American Chemical Society 136(22), pp. 7805-7808 (2014).

(56) References Cited

OTHER PUBLICATIONS

Zhang, et al., "Synthesis and Oxygen Reduction Activity of Shape-Controlled Pt3Ni Nanopolyhedra," Nano Letters 10(2), pp. 638-644 (2010).

Greeley, et al., "Electronic Structure and Catalysis on Metal Surfaces," Annual Review of Physical Chemistry 53, pp. 319-348 (2002).

Mceachran, et al., "Ultrathin Gold Nanoframes through Surfactant-Free Templating of Faceted Pentagonal Silver Nanoparticles," Journal of the American Chemical Society 133(21), pp. 8066-8069 (2011).

Carey, "Dichlorobenzene," Encyclopaedia Britannica, retrieved from https://www.britannica.com/science/dichlorobenzene, 1 page (2008).

Niu, et al., "Synthesis of Pt-Ni Octahedra in Continuous-Flow Droplet Reactors for the Scalable Production of Highly Active Catalysts toward Oxygen Reduction," Nano Letters 16(6), pp. 3850-3857 (2015).

Wang, et al., "Phase and Interface Engineering of Platinum-Nickel Nanowires for Efficient Electrochemical Hydrogen Evolution," Angewandte Chemie 55(41), pp. 12859-12863 (2016).

Choi, et al., "Synthesis and Characterization of 9 nm Pt-Ni Octahedra with a Record High Activity of 3.3 A/mgPt for the Oxygen Reduction Reaction," Nano Letters 13(7), pp. 3420-3425 (2013).

Guo, et al., "Tuning Nanoparticle Catalysis for the Oxygen Reduction Reaction," Angewandte Chemie 52(33), pp. 8526-8544 (2013).

Herron, et al., "Oxygen Reduction Reaction on Platinum-Terminated "Onion-structured" Alloy Catalysts," Electrocatalysis 3(3-4), pp. 192-202 (2012).

Notice of Allowance on U.S. Appl. No. 15/996,297 Dtd Jul. 10, 2020.

Snyder, et al., "Oxygen Reduction Reaction Performance of [MTBD][beti]-Encapsulated Nanoporous NiPt Alloy Nanoparticles," Advanced Functional Materials 23(44), pp. 5494-5501 (2013).

Wang, et al., "Synthesis of Monodisperse Pt Nanocubes and Their Enhanced Catalysis for Oxygen Reduction," Journal of the American Chemical Society 129(22), pp. 6974-6975 (2007).

White Bird, "Implementation of gradient-corrected exchange-correlation potentials in Car-Parrinello total-energy calculations," Physical Review B 50(7), pp. 4954-4957 (1994).

Gocyla, et al., "Shape Stability of Octahedral PtNi Nanocatalysts for Electrochemical Oxygen Reduction Reaction Studied by in situ Transmission Electron Microscopy," ACS Nano 12(6), pp. 5306-5311 (2018).

Alia, et al., "Oxidation of Platinum Nickel Nanowires to Improve Durability of Oxygen-Reducing Electrocatalysts," Journal of The Electrochemical Society 163(3), pp. F293-F301 (2016).

* cited by examiner

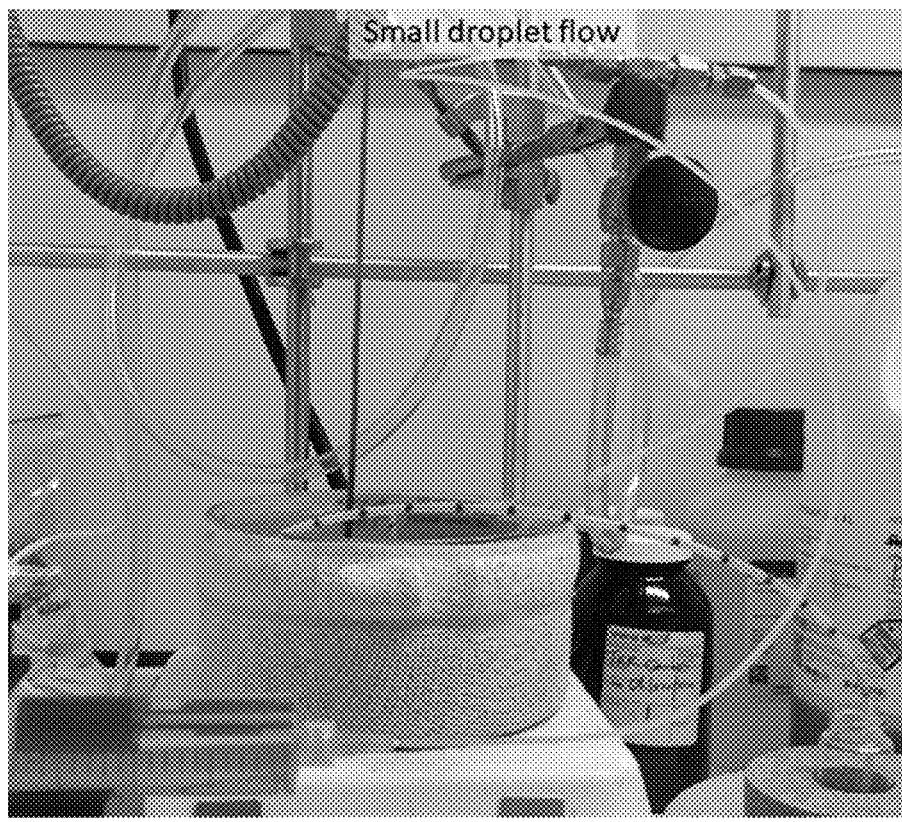
FIG. 2A
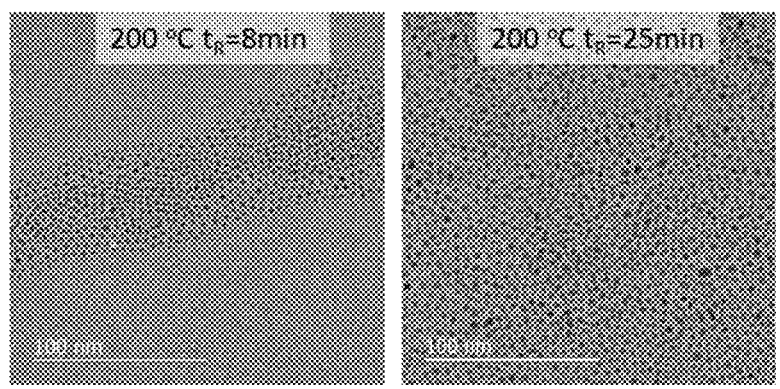
FIG. 2B
FIG. 2C
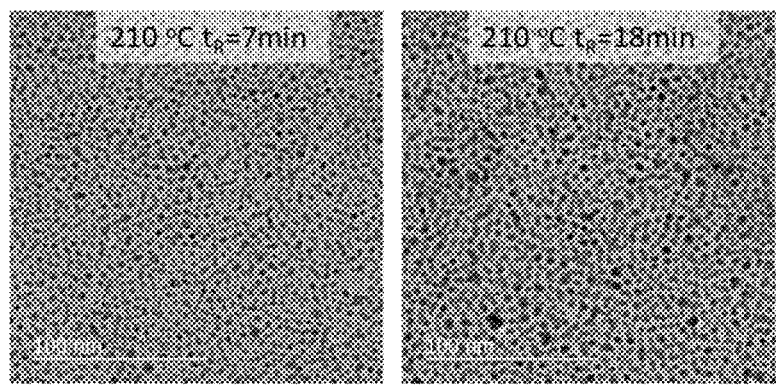
FIG. 2D
FIG. 2E

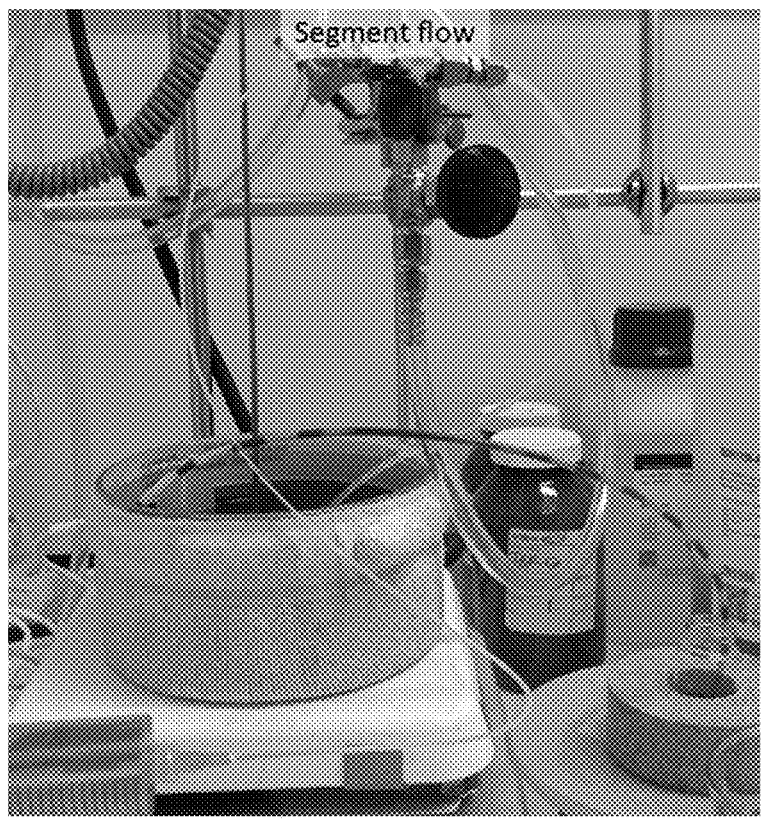
FIG. 4A
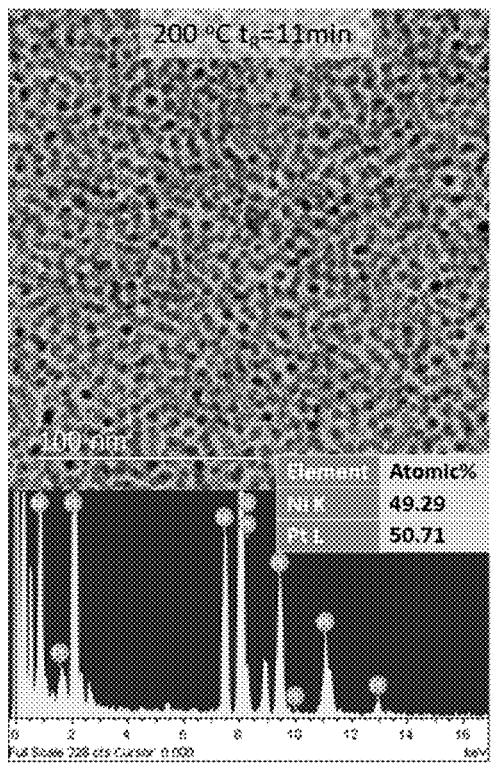 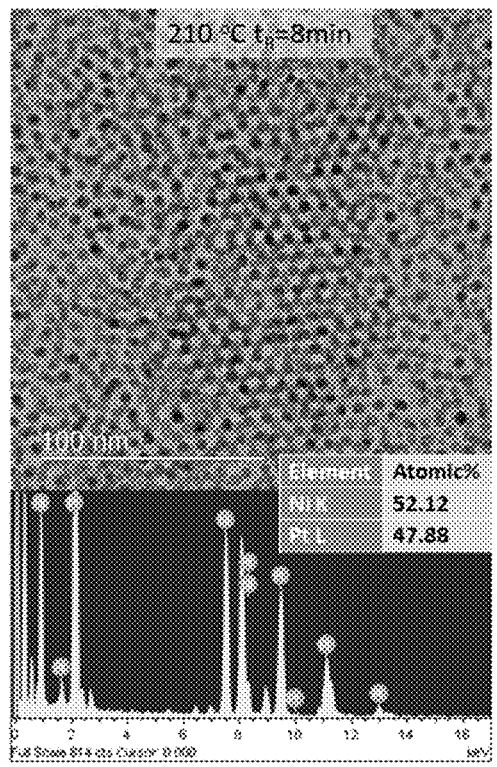
FIG. 4B				FIG. 4C

SYSTEMS AND METHODS FOR PLATINUM NANOCATALYST SYNTHESIS VIA CONTINUOUS FLOW REACTOR

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to method of synthesizing and compositions for platinum based nanomaterials, particularly platinum nickel and platinum cobalt nanoparticle structures.

BACKGROUND

In the last few decades, significant efforts have been devoted to improving the activity and durability of Pt-based nanomaterials for oxygen reduction reaction ("ORR") aiming to overcome the high price and scarcity problems of Pt-based catalysts for fuel cell application in stationary and automobile sectors. Since the discovery of the 90-fold activity improvements of nano-segregated $Pt_3Ni(111)$ surface in comparison to commercially available platinum on carbon ("Pt/C") catalysts, a variety of nanocrystals with different shapes and significant improved activities have been developed, in most cases, using solution-phase synthesis methods. In contrast to a Pt/C catalyst prepared by impregnation method, these nanocrystals made by solution-phase synthesis usually have well controlled shape and composition and monodispersed particle size; thus, their surfaces could be fine-tuned to give much higher catalytic activities. However, these highly active nanocrystals can usually only be made in milligram scale because great attention has to be paid to the synthesis and post-treatment processes in order to keep the desired morphologies, particle sizes, and surface composition profiles. This is barely enough for physical characterizations and electrocatalytic activity testing on rotating disk electrode ("RDE"), and their performances in real fuel cell membrane electrode assembly ("MEA") have rarely been investigated, which greatly hinders the commercialization of fuel cell technology. Gram scale of high quality nanocrystal catalyst should be made available for MEA testing in order to bridge the gap between fundamental researches and real device investigations.

It is generally very challenging to scale up nanomaterials because their formation processes are very sensitive to different reaction parameters, which usually inevitably change with the increase of the reaction volume. Sometimes, even trace amount of impurities in the precursors or solvents will result in total different morphologies. This critical information for scale up is usually not known when the material synthesis is discovered, and extensive research is required to reveal the true factors governing the nanomaterial formation, especially if these factors can be controlled at larger scale. Only at this point can one tell if this material is scalable and what is the best way to scale it up: either using traditional batch synthesis or in a microfluidic chip or tubular channel of continuous flow reactors where the reaction parameters can be controlled in a more precise way. When it comes to electrocatalytic materials, synthesis of nanocrystals is only the start of the electrocatalyst preparation. These nanocrystals should be uniformly loaded onto conducting materials, such as high-surface-area carbon particles. In most cases, the surfactant used to stabilize the growth of nanocrystals should be removed, and desired surface structures will be created by chemical or electrochemical leaching and/or further annealing processes. The electrocatalyst can only be scaled up when every single step of the multi-step process is proven to be scalable. In this regard, recent shape-controlled synthesis of nanocrystals using solid-state chemistry methods significantly simplify the electrocatalyst preparation process. However, the control of nanocrystal shape and size and the composition of solution-phase synthesis is superior to solid-state reactions and usually results in much higher catalytic activities.

Multi-layered Pt-skin nanoparticle catalysts have been synthesized by solution-phase synthesis and recently by a one-pot synthesis (U.S. patent application Ser. No. 15/996, 297). However, the synthesis conditions at larger scale in batch mode is time- and material-consuming, complicating scale-up. Furthermore, for nanomaterials whose formation mechanisms are sensitive to reaction parameter changes, it would be very challenging to scale up the synthesis in batch because the heat transfer and mass transfer in a batch reactor will inevitably change with scale.

While these advanced materials have been produced on a small scale and through laboratory batch production, there remains a need for a feasible process capable of producing desirable nanocatalysts in a scalable or industrial scale process.

SUMMARY

Embodiments described herein relate generally to a method of synthesizing Pt nanoparticle catalyst. The method comprises forming, at an initial temperature of 18-28° C., a reaction mixture. The reaction mixture comprises a nickel precursor, a reducing agent, and a surfactant comprising one part oleic acid to two parts oleylamine, a platinum precursor, and a polar solvent. The method further includes injecting a segment of reaction mixture into a continuous flow reactor at a temperature of at least 190° C. for 5 minutes to 1 hour, forming a PtNi nanoparticle solution, the segment having a segment length of at least 3 mm. The PtNi/substrate nanoparticles are isolated by: sonicating the PtNi nanoparticle solution with substrate in chloroform solution, adding hexane to the sonicated chloroform solution, precipitating PtNi/substrate nanoparticles, and collecting the PtNi/substrate nanoparticles by filtration. The PtNi/substrate undergo acid leaching by: sonicating the collected PtNi/substrate nanoparticles in water, mixing an acid with the sonicated PtNi/substrate sonicated in water for 60 minutes, and collecting the leached PtNi/substrate nanoparticles by filtration. The leached PtNi/substrate nanoparticles are annealed, forming a Pt-skin on the PtNi/substrate nanoparticles.

Other embodiments described herein relate generally to a method of forming Pt nanoparticle. The method comprises forming, at a temperature of 18-28° C., a reaction mixture. The reaction mixture comprises a nickel precursor, a reducing agent, a surfactant comprising one part oleic acid to two parts oleylamine, a platinum precursor, and a polar solvent. The method further includes injecting a segment of reaction mixture into a continuous flow reactor at a temperature of at least 190° C. for 5 minutes to 1 hour, forming a Pt nanoparticle solution. The segment has a segment length of at least 3 mm.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 2A is a small droplet flow mode. FIGS. 2B-2E are transmission electron microscopy ("TEM") images of PtNi nanoparticles obtained under specified conditions.

FIG. 4A is a segment flow mode. FIGS. 4B-4C are TEM images and EDX results of PtNi nanoparticles obtained under specified conditions.

FIGS. 6A-6C are TEM images of PtNi nanoparticles collected between 0-10 minutes (FIG. 6A), 30-40 minutes (FIG. 6B), and 140-150 minutes (FIG. 6D) with residence time of 26 minutes in a continuous flow reactor. FIG. 6D is a TEM image and FIG. 6E are EDX mappings of the multilayered Pt-skin nanoparticle catalyst synthesized in a flow reactor.

FIG. 7B shows EDX results of the resultant PtCo material from the reactor of FIG. 7A. FIGS. 7C-7D are TEM images of the PtCo material.

FIG. 8B is a TEM image of PtCo material from the reactor of FIG. 8A. FIG. 8C shows EDX results of PtCo material from the reactor of FIG. 8A.

Figure 1A:
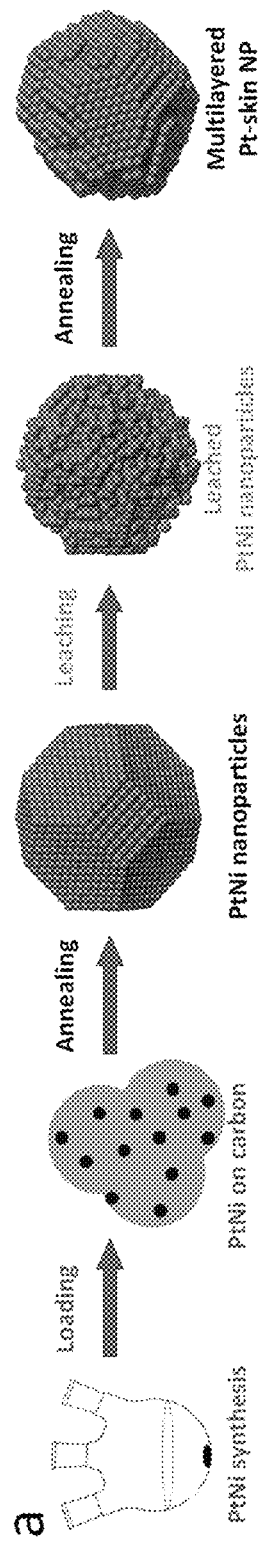
FIG. 1A is a schematic illustration of a multi-step synthesis procedure of multi-layered Pt-skin nanoparticle catalyst.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Described herein is a scalable process to manufacture nanoparticle in a reactor with continuous flow of reagents, which has been widely used in the pharmaceutical industry and offers the opportunity to control the key parameters of nanocrystal synthesis even for the most complicated nanostructures. The problem of batch-to-batch variation often seen in batch synthesis can be eliminated in a flow reactor. More importantly, the process developed in a flow reactor can be readily scalable by numbering up without changing the reaction conditions.

Prior processes suffered from the low solubility of the PtNi nanoparticle metal precursors in organic solvents at room temperature (e.g., 18-28° C. or, preferably, 20-24° C.). The precipitation of precursors from the liquid phase is a major limitation that previously has restricted such PtNi synthesis to a batch approach due to non-uniform reaction and clogging of the flow reactor if a continuous approach were to be attempted. FIG. 1A is a schematic illustration of a multi-step synthesis procedure of multi-layered Pt-skin nanoparticle catalyst as a batched process.

Figure 1B:
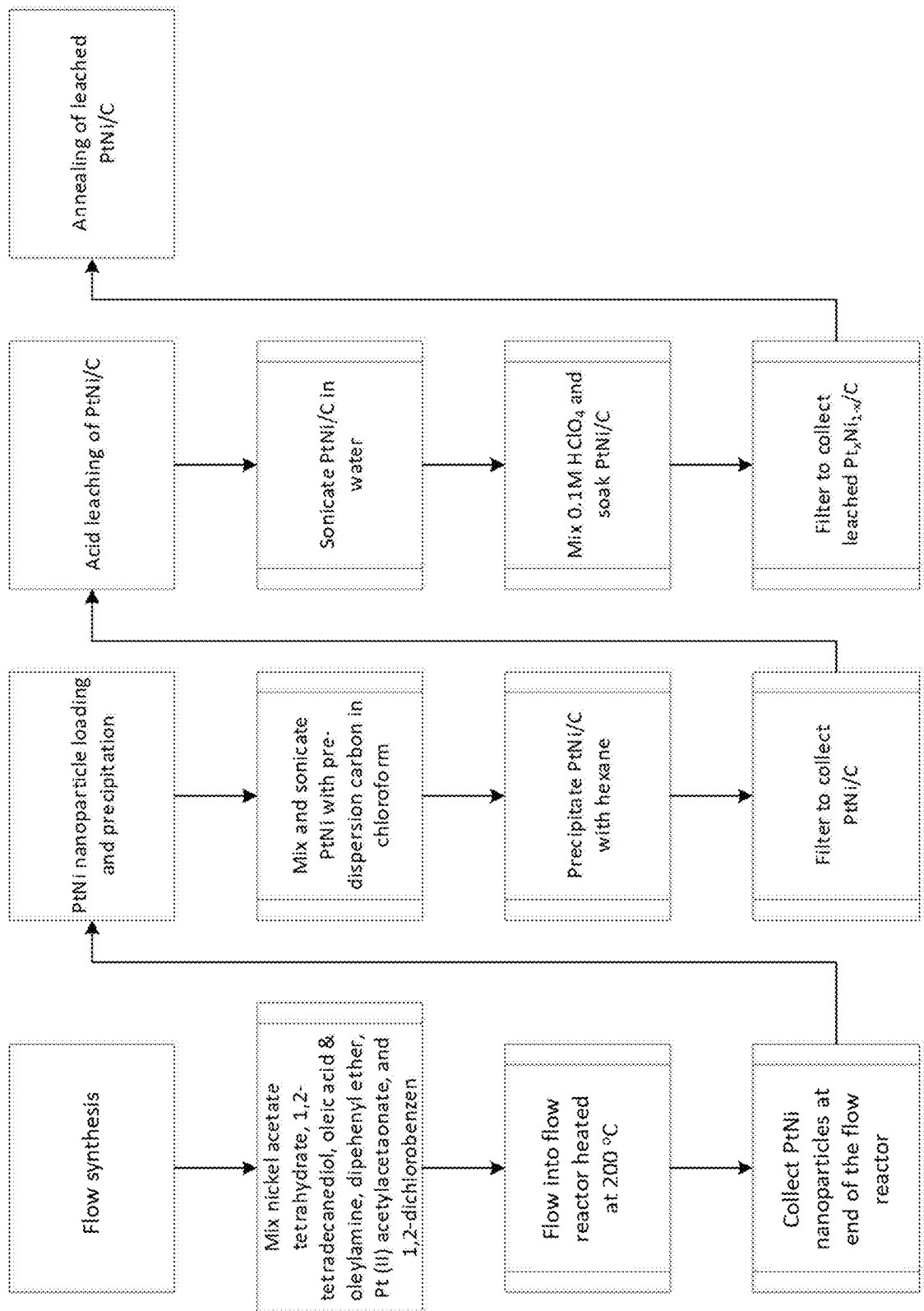
FIG. 1B illustrates a detailed multi-step process for one embodiment of a continuous flow process.
Figure 3A:
FIG. 3A is a continuous flow mode.
Figure 3B:
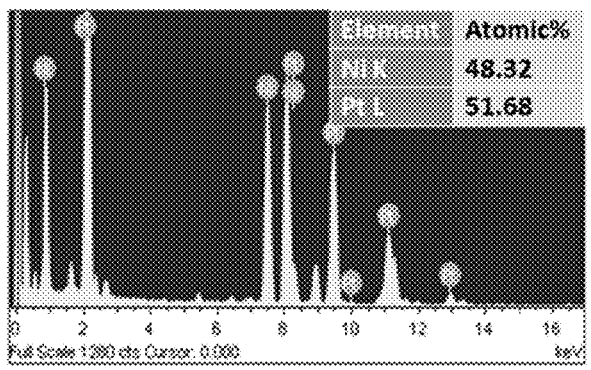
FIG. 3B shows energy-dispersive x-ray spectroscopy ("EDX") results of PtNi nanoparticles obtained under specified conditions.
Figure 3C:
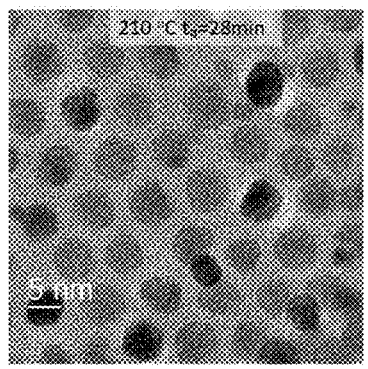
FIGS. 3C-3D are TEM images of PtNi nanoparticles obtained under specified conditions.
Figure 3D:
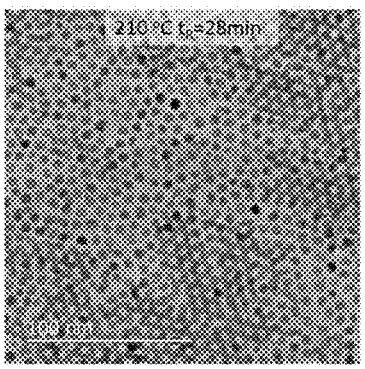
Figure 5A:
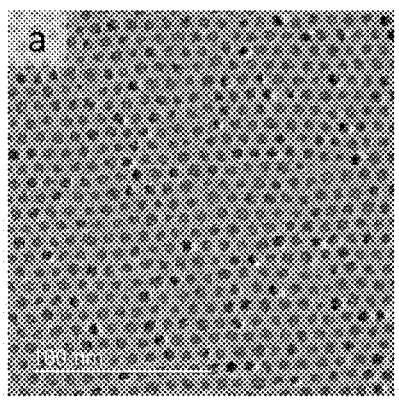
FIGS. 5A-5E show PtNi nanoparticles synthesized in a flow reactor with different amounts of oleic acid: 0.5 times (FIG. 5A), 0.8 times (FIG. 5B), 1 times (FIG. 5C), 1.5 times (FIG. 5D), and 2 times (FIG. 5E) standard condition with residence time of 10 min.
Figure 5B:
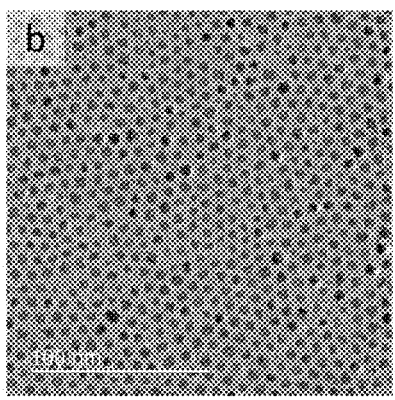
Figure 5C:
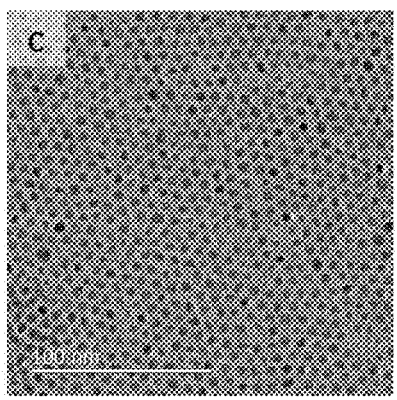
Figure 5D:
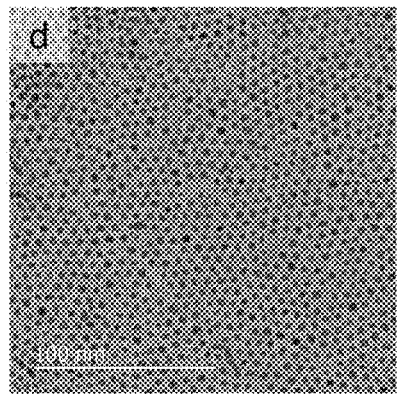
Figure 5E:
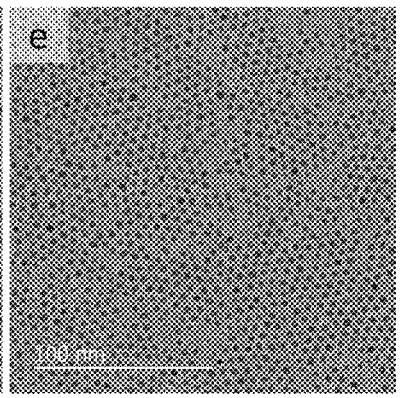

One embodiment relates to a synthesis process scalable to industrial scale production (i.e., greater than 5 g, 100 g, 10 kg, 100 kg batches) to enable production of tons to kilotons of material per year. In one embodiment, the synthesis process forms the PtNi nanoparticle in a flow reactor. In one implementation, the process utilizes a one-pot process (see, e.g., U.S. patent application Ser. No. 15/996,297, incorporated herein by reference) that begins at room temperature rather than utilize a hot injection process and proceeds through a flow reactor. FIG. 1B illustrates a detailed multi-step process for one embodiment of a continuous PtNi synthesis.

As illustrated in FIG. 1B, step 1 is a flow synthesis that begins with a room temperature reaction mixture and uses large reaction mixture segment size when injected into the flow reactor. Step 2 is a loading of the PtNi nanoparticles on carbon and removal of the resultant loaded material by precipitation and filtration. Step 3 is acid leaching of the PtNi/C material by dispersion of the material in water and acidification of the dispersion followed by filtration recover. Step 4 is annealing of the leached PtNi/C material.

In accordance with some embodiments, a continuous flow synthesis process is described. In one embodiment, a reaction mixture is formed, such as at room temperature (20-24° C.), for use with the continuous flow reactor as the feedstock. In one embodiment of the reaction mixture, the materials may be added to form the reaction mixture without order requirement. In one embodiment, a nickel precursor (e.g., nickel acetate tetrahydrate), a reducing agent (e.g., 1,2-tetradecanediol), a surfactant (e.g., oleic acid and/or oleylamine), platinum precursors (e.g., platinum(II) acetylacetonate), and a polar solvent (e.g., 1,2-dichlorobenzene and/or diphenyl ether) are included in the reaction mixture. Using 1,2-dichlorobenzene results in increased uniformity in particle size. In some embodiments, 1,2-dichlorobenzene and/or diphenyl ether are included; the diphenyl either provides the basic solvent environment and the dichlorobenzene contributes to the uniformity of nanoparticle (without dichlorobenzene, particles are less uniform). The ratio of oleic acid to oleylamine may be varied to control particle size, with increasing ratio of oleic acid associated with smaller particle size.

In one embodiment, a synthesis proceeds with 1.336 g nickel acetate tetrahydrate, 1.04 g platinum acetylacetonate, 0.68 g 1,2-tetradecanediol, 8 mL oleylamine, 4 mL oleic acid, 24 mL 1,2-dichlorobenzene, and 160 mL diphenyl ether that are mixed together, such as by magnetic bar stirring at ~400 rpm for 20 minutes under argon flow. It should be appreciated that these amounts may be scaled up where the relative amounts of each component remain the same.

In order to remove any residual water, the reaction mixture may be heated to above 100° C. In one embodiment, the reaction mixture is held at 110° C. for 2 hours to remove water. The reaction mixture is then transferred to a feedstock system for the flow reactor, for example to a syringe for injection in segmented continuous flow reactor. PtNi nanoparticle synthesis was performed by pumping/injecting the reaction mixture into a reaction vessel of the reactor, such as a fused silica capillary tube (or PTFE tube or glass tube coil). The reaction vessel may be heated to the reaction temperature by conventional means, such as heated inside an oil batch or a convection oven. The reaction time, or residence time, was controlled by the length of the reactor and flow rate of material through the reactor. The particle composition can be changed by changing the ratios of the Pt and Ni precursors, for example 1.2-1.4 g of nickel acetate tetrahydrate per 0.95-1.15 g platinum acetylacetonate.

In one embodiment, the synthesis occurs in a flow reactor system for use as described herein. The above described solvent system provided to the reactor as the reaction mixture. Prior approaches have used batch reactions and failed to produce monodispersed particles. Attempts at a continuous flow reaction failed to produce an acceptable particle due to failure of the nickel to sufficiently integrate into the formed particles. For a segmented flow reactor, the reaction mixture is provided in segments or drops to a continuous flow (e.g., with the segment or drop having a volume based on a segment length and the diameter of the reactor and moving through the reactor with a transport solvent). In one embodiment, the reaction mixture is chemically and physically isolated to the defined segment/droplet by an immiscible solvent or atmosphere spacer. The transport solvent may be present as a segment between two immiscible solvent or atmosphere spacers to aid in flow of the material through the reactor. The reaction mixture is at an initial temperature, such as room temperature, and is pumped into the reactor at a selected rate to form the segment/droplet. In one embodiment, the range of rates and pressures are 0.1 ml/h to 100 ml/min depending on the diameter of the flow reactor, pressure can be from atmosphere pressure to 20 bar. The reactor has a reaction temperature (e.g., 190° C. to 220° C.). The reaction proceeds for a reaction time (e.g., 5 minutes to 1 hour). It should be appreciated that the reaction time is controlled by the length of the flow reactor and the flow rate of the reaction mixture (i.e., how long the reaction mixture stays in the flow reactor).

In batch synthesis, Pt and Ni precursors are dissolved in organic solvents at elevated temperature before reaching reaction temperature. In contrast, in one embodiment of a flow reactor, all the metal precursors, solid reducing agents, and surfactants should be dissolved at room temperature in order to achieve uniform and consistent reaction. For example, the dissolution of nickel acetate in the reaction mixture is controlled by the coordination of the Ni ion with oleylamine and the amount of oleylamine surprisingly controls the solubility of Ni precursor. In one embodiment, the oleylamine is present in a 2:1 ratio with the oleic acid. In one embodiment, all of the reaction materials are dissolved at room temperature (20-24° C.), including the metal precursors.

In addition, the utilization of a flow reactor requires adaptation of the synthesis to address the issue that continuous flow may result in poly-dispersed nanoparticle because of the laminar flow nature in the flow reactor and disruptions to that flow condition due to changes in the materials in the reaction mixture, including phase changes. It was discovered that for PtNi nanoparticle synthesis in flow reactor, monodispersed, such as about 5 nm diameter, PtNi nanoparticle are obtained with large segments/droplets but not obtained with small segments/droplets flow at different temperatures with different residence times (FIGS. 2A-2E). In one embodiment, the synthesis proceeds with sufficiently large segments/droplets to result in monodispersed particles, that is particles that have a diameter of ±10% (e.g., 4.5-5.5 nm). In one embodiment a short segment/droplet is less than 3 mm in length and a large segment is greater than 3 mm (e.g., greater than 10 mm) up to a continuous flow. It is believed that dichlorobenzene (boiling point of 182° C.), which in some embodiments is critical to the synthesis of monodispersed PtNi nanoparticle, is evaporated at reaction temperature, a condition exacerbated when the droplet is smaller. It is also believed that the suppression of the evaporation may be aided by any other factors, such as the flow rate, the material used for the reactor flow path. For example, the faster the flow rate and the thicker the reactor, the less evaporation of dichlorobenzene. Further, the lower the reaction temperature, the less evaporation but the longer the overall reaction takes to form a similar size particle.

Indeed, monodispersed PtNi nanoparticle is obtained with a continuous flow mode (FIGS. 3A-3D) and segment flow mode (FIGS. 4A-2C). For segment flow (longer segment) we obtained monodispersed particles. It is believed that the segments for the tested sample were large enough to avoid evaporation, thereby resulting in the monodispersed les. Interestingly, the segmentation of the continuous flow reaction solution because of the evaporation of dichlorobenzene can be observed (FIGS. 3A-3D). The segmentation of continuous flow by the evaporation of dichlorobenzene breaks the laminar flow nature usually seen in continuous mode, therefore disrupting the monodispersed particle formation. For tube diameter of 2-5 mm, it is observed that segment size of 1-3 mm are too small, segment size of 5-10 mm is sufficient. It is believed that smaller tube diameter need longer segment size while larger tube diameter require shorter segment size. Uniform segment size contributes to the particles uniformity. while a true continuous flow may result in non-uniform particle size, such as if the tube diameter changed. However, it has been discovered that as long as the segments of the flow are big enough (or during continuous flow), the evaporation of dichlorobenzene is not as fast as the nucleation and growth of the PtNi nanoparticle. Thus, the formation of monodispersed PtNi nanoparticle is not affected. Thus, for segmented continuous flow reactors, such as those utilizing a droplet mechanism through a feed needle, droplet size was observed to have an impact on the scale-up of the process. A large droplet (greater than 3 mm, preferably greater than 10 mm) provided positive results while the use of a small droplet (smaller than 3 mm) did not work.

Note that experiments demonstrated the synthesis of PtNi nanoparticle in flow reactor in tubes of different materials (e.g., polytetrafluoroethylene, fused silica, quartz, and glass) with different tube diameters (a few hundred micrometers to several millimeters), different reaction temperatures, and residence times. The particle size could be tuned by changing the amount of oleic acid (FIGS. 5A-5E) such that particle size increased with a decrease in the amount of oleic acid, which is consistent with previously reported results in batch synthesis using the hot injection method.

Figures 6A, 6B, 6C, 6D:
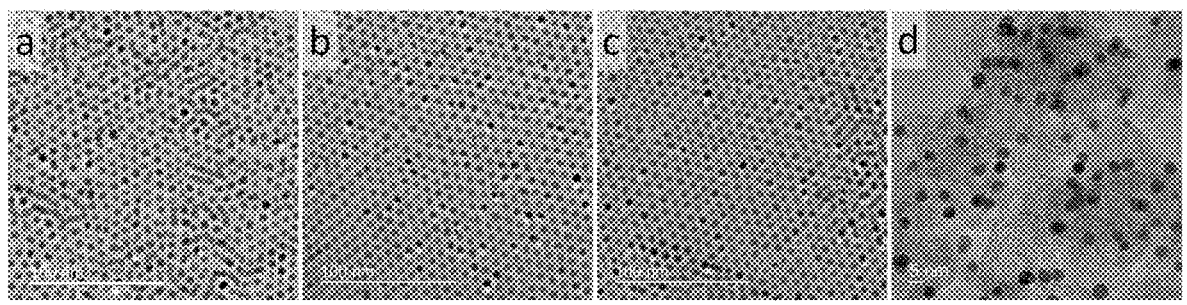
FIGS. 6A-6E show TEM and electrochemistry of catalysts produced with flow reactor.
Figure 6E:
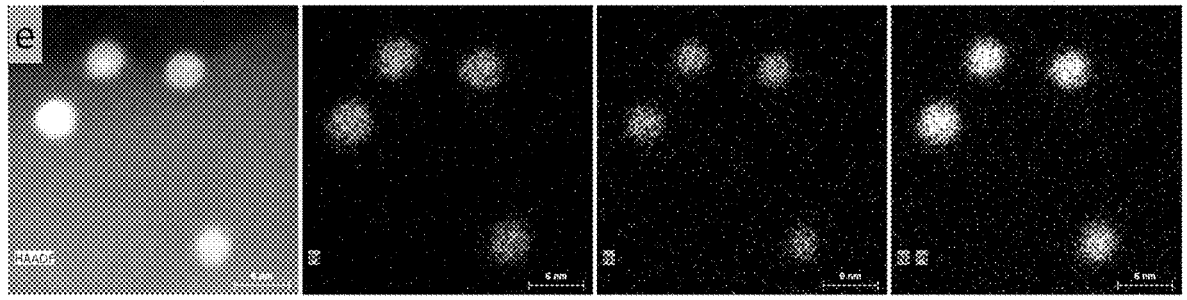

For a flow reactor process it is critical to provide an unchanged particle quality through the operation time. As shown in FIGS. 6A-6C, particle size and composition did not change within 2.5 hours continuous operation of a process, in accordance with embodiments described herein, with the same 26 minutes residence time. The PtNi nanoparticles collected during 40-140 minutes reaction were loaded on carbon and treated with annealing and acid leaching processes to make a multi-layer Pt-skin nanoparticle catalyst. The TEM and EDX mapping results of this catalyst are shown in FIGS. 6D-6E. As shown in FIG. 6D, 5 nm PtNi nanoparticles are distributed on carbon uniformly. The EDX mapping results shown in FIG. 6E clearly demonstrated the Pt-rich shell structure on the surface of PtNi nanoparticles. RDE results summarized in Table 1 further demonstrate the formation of Pt-skin structure. The higher mass activity compared with the scaled up batch samples (U.S. patent application Ser. No. 15/996,297) is due to the higher specific surface area of the flow reactor synthesized particles. These results demonstrate that the PtNi nanoparticle with multi-layer Pt-skin can be successfully synthesized in a flow reactor.

More importantly, the unchanged particle size and composition at different operation times indicate that future scale up is feasible by increasing operating time. Further, the formation of the PtNi material may also include a scaled up loading and acid leaching procedures.

"loaded" on a substrate, for example a carbon substrate. The PtNi nanoparticles and carbon are dispersed in an organic dispersant, such as in chloroform by sonication to form a slurry. The slurry is the mixed with a precipitant, such as hexane, to form a precipitate of the PtNi nanoparticles. The precipitated materials are collected by filtration or other collection means and, preferably, vacuum dried.

Following the synthesis in the flow reactor, the particles are collected and undergo a post synthesis treatment. For example, the particles undergo an acid leaching.

Following loading of the PtNi on carbon and collection of the resultant PtNi/C, the material maybe further treated such as by acid leaching. The carbon supported PtNi nanoparticles are dispersed in dispersant, such as water by sonication, and an acid, such as an equal volume of acid (e.g., $HClO_4$) is added. The material is acid leached for 10 minutes to 24 hours and collected, such as by filtration and washed by water. The collected materials may be dried in a vacuum oven at 80° C. overnight.

The PtNi/C materials may be further, such as after acid leaching, treated, such as by thermal treatment (e.g., annealing). The annealing may be on an alumina boat and annealed at 400° C. for 1 hour in a tube furnace under flow of 3% $H_2$/Ar.

In a further embodiment, PtCo particles may be formed. The same method is utilized as described above, but using Cobalt(II) acetate stead of Ni acetate tetrahydrate. This embodiment otherwise uses the same precursor/surfactant/reducing agent ratio. Oleic acid concentrations were

TABLE 1

Electrochemical results of different catalysts.

| | ECSA CO/HUPD | SSA ($m^2$/g) | 0.9 V (mA/$cm^2$) | 0.95 V (mA/$cm^2$) | 0.9 V (A/mg) | 0.95 V (A/mg) |
|---|---|---|---|---|---|---|
| Pt/C TKK | 1.04 | 44 | 0.82 | 0.12 | 0.36 | 0.05 |
| JACS[†] | 1.44 | 40 | 5 | 0.85 | 2 | 0.34 |
| 5 g batch 1[‡] | 1.38 | 60 | 5.9 | 0.72 | 3.5 | 0.43 |
| 5 g batch 2[‡] | 1.37 | 64 | 6.4 | 0.73 | 4.1 | 0.46 |
| Flow reactor | 1.27 | 75 | 5.9 | 0.65 | 4.4 | 0.49 |

[†]WANG, et al., "Design and Synthesis of Bimetallic Electrocatalyst with Multilayered Pt-Skin Surfaces," Journal of the American Chemical Society 133(36), pp. 14396-14403 (2011).
[‡]U.S. patent application Ser. No. 15/996,297.

In general, while there are several parameters to the synthesis of the catalysts, not all parameters were shown to be relevant to solving the problem of the low solubility of the precursors. In particular, increasing the reaction time/temperature, decreasing the precursor concentrations, increasing the dichlorobenzene amount, changing the timing for the water removal, and using different precursors did not yield a scalable synthesis process. However, positive results were experienced when the surfactant amount was changed and when the droplet size was changed.

The reaction materials may be purged with an inert gas at greater than room temperature to remove hydrate water, such as from the nickel precursor.

In one embodiment, PtNi nanoparticles from continuous flow process have surfactants removed. For example, the surfactants on the surface of PtNi nanoparticles are removed by annealing in a furnace, such as at 185° C. for 20 hours in air. Preferably, the thickness of the catalyst layer should be less than a few millimeters (2-3 mm) to avoid ignition of the catalyst by excess heat generated during the oxidation of surfactant on the surface of PtNi nanoparticles.

Figure 7A:
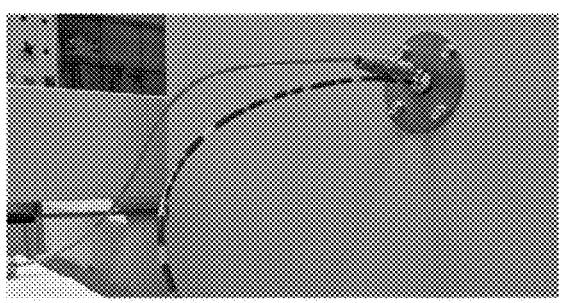
FIGS. 7A-7D show a PtCo synthesis in flow reactor with continuous flow mode.
Figure 7B:
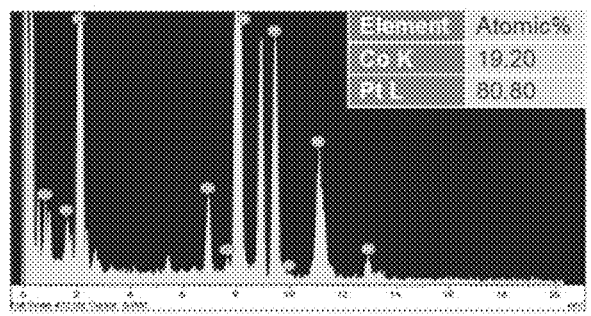
Figure 7C:
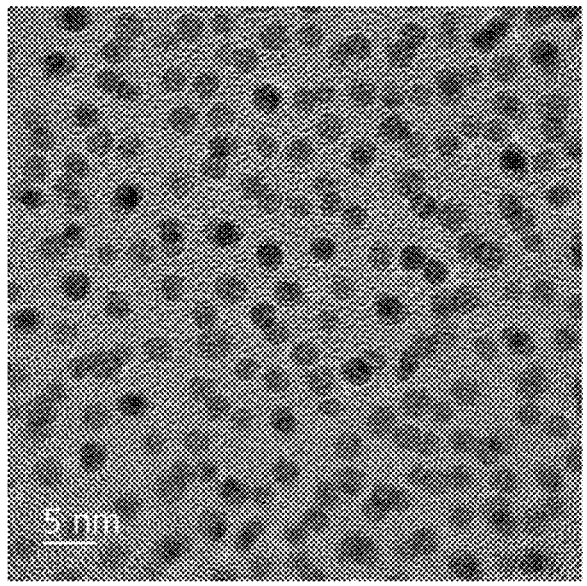
Figure 7D:
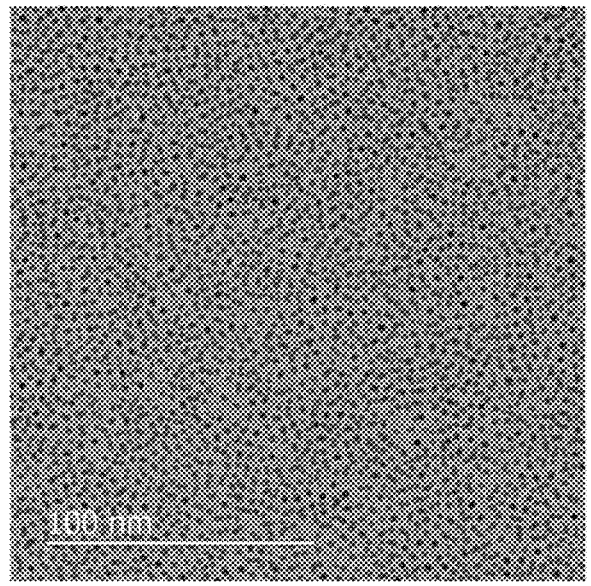

Following PtNi nanoparticle synthesis by the continuous flow reactor methods described, the nanoparticles may be changed in order to see if particle size could be controlled. However, in contrast to PtNi, same PtCo particle size were obtained despite difference oleic acid concentrations. It is believed that PtCo particle size may be controlled by changing reducing agent amount or increase reaction temperature. FIGS. 7A-7D show a PtCo synthesis in flow reactor with continuous flow mode. FIG. 7B shows EDX results of the resultant PtCo material from the reactor of FIG. 7A. FIGS. 7C-7D are TEM images of the PtCo material.

Figure 8A:
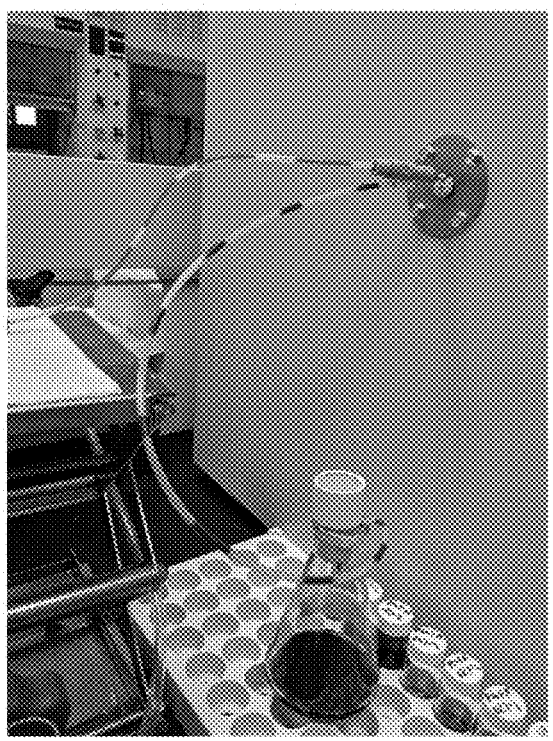
FIGS. 8A-8C show a PtCo synthesis in flow reactor with segment flow mode.
Figure 8B:
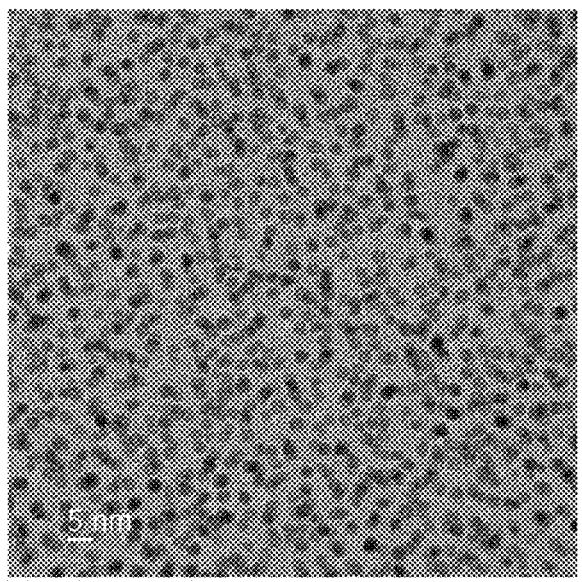
Figure 8C:
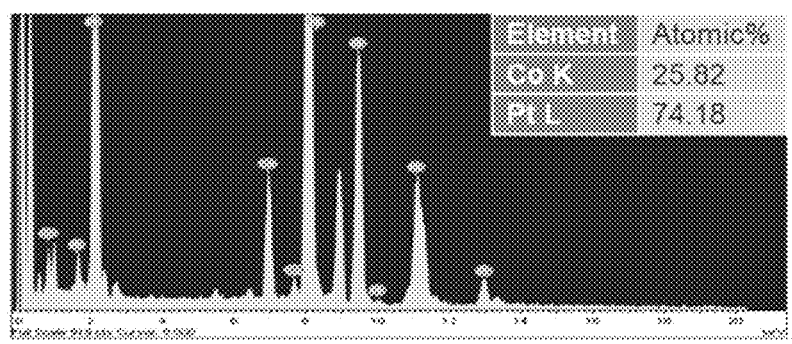

FIGS. 8A-8C show a PtCo synthesis in flow reactor with segment flow mode. FIG. 8B is a TEM image of PtCo material from the reactor of FIG. 8A. FIG. 8C shows EDX results of PtCo material from the reactor of FIG. 8A.

EXAMPLES

The above described results were obtain based upon the following samples.

Synthesis of PtNi nanoparticles in flow reactor. In a 250 mL 3-neck round bottom flask, 1.336 g nickel acetate tetrahydrate, 1.04 g platinum acetylacetonate, 0.68 g 1,2-tetradecanediol, 8 mL oleylamine, 4 mL oleic acid, 24 mL 1,2-dichlorobenzene, and 160 mL diphenyl ether were mixed together by magnetic bar stirring at ~400 rpm for 20 minutes under argon flow. The solution was heated up to 110° C. to speed up dissolution and remove $H_2O$. The solution was held at 110° C. for 2 hours to remove water and then cooled down to room temperature before being transferred to a syringe with a long needle. PtNi nanoparticle synthesis was performed by pumping the reaction mixture into a fused silica capillary tube (or polytetrafluoroethylene tube) which was heated inside an oil batch or a convection oven at specific temperature. The reaction time, or residence time, was controlled by the length of the reactor and flow rate. To investigate the effect of oleic acid amount, the solutions with double amount of oleic acid and that without oleic acid were prepared separately and mixed in different volume ratios in a syringe before pumping into the flow reactor. PtNi nanoparticles were collected by centrifuging at 8000 rpm and further washed with hexane and ethanol.

Loading of PtNi nanoparticles on carbon. The proper amount of carbon was dispersed in chloroform by sonication to form a uniform slurry. PtNi nanoparticles dispersed in chloroform were mixed with carbon slurry and sonicated for 20 min. Carbon supported PtNi nanoparticles were precipitated from chloroform by adding the same volume of hexane. The precipitated materials were collected by filtration and dried in vacuum oven at 80° C. overnight.

Removing surfactant. The surfactants on the surface of PtNi nanoparticles were removed by annealing in a furnace at 185° C. for 20 hours in air. The thickness of the catalyst layer should be less than a few millimeters (2-3 mm) to avoid ignition of the catalyst by excess heat generated during the oxidation of surfactant on the surface of PtNi nanoparticles.

Acid leaching. Carbon supported PtNi nanoparticles were dispersed in water by sonication and the same volume of 0.1 M $HClO_4$ was added. The material was soaked in the acid for different times and collected by filtration and washed by water. The collected materials were dried in a vacuum oven at 80° C. overnight.

Annealing. Acid leached PtNi nanoparticles supported on carbon were loaded in an alumina boat and annealed at 400° C. for 1 hour in a tube furnace under flow of 3% $H_2$/Ar. The activity of the catalyst was not affected by the thickness of the catalyst (from ~1 mm to ~1 cm) in the alumina boat during annealing.

Electrochemistry. All the electrochemical testing was performed at room temperature in 0.1 M $HClO_4$ electrolyte in a three-electrode configuration. The electrochemical cell and all its components were cleaned in concentrated $H_2SO_4$/$HNO_3$ and washed in boiling water (18.2 MΩ) before each measurement. A commercially available Ag/AgCl electrode was connected to the electrochemical cell with a salt bridge and used as the reference electrode. The potential of reference electrode was calibrated with hydrogen evolution/oxidation reaction in each experiment. The catalyst was loaded onto a glassy carbon rotating disk electrode with diameter of 6 mm and used as the working electrode. A Pt wire coil was used as the counter electrode. Catalyst ink with a concentration of 0.5 mg/mL was made before each measurement. Depending on the Pt mass loading of the catalyst, 15-2 5 μL of ink was loaded onto the glassy carbon electrode. The exact loading of Pt on glassy carbon electrode was determined with ICP measurement from the same ink, and this was used to determine Pt mass activity. A stable state of the electrode was achieved after 20 cyclic voltammetry ("CV") cycles between 0.06 B and 1.00 V with 50 mV/s scan rate. The ORR was measured using a 20 mV/s scan rate. Double layer capacitance under Ar purging, also measured at 20 mV/s scan rate, was subtracted and electrolyte resistance was corrected by iR compensation. Pt electrochemical surface area ("ECSA") specific activity was obtained by normalizing the current to ECSA from carbon monoxide stripping.

Definitions.

As used herein, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of synthesizing Pt nanoparticle catalyst comprising the steps of:
   forming, at an initial temperature of 18-28° C., a reaction mixture comprising a metal precursor comprising nickel acetate tetrahydrate, a reducing agent comprising 1,2-tetradecanediol, and a surfactant comprising one part oleic acid to two parts oleylamine, a platinum precursor comprising platinum acetylacetonate, and a polar solvent;
   heating the reaction mixture at 110° C. for two hours, removing water;
   injecting a segment of reaction mixture into a continuous flow reactor at a temperature of at least 190° C. for 5 minutes to 1 hour, forming a PtNi nanoparticle solution, the segment having a segment length of at least 3 mm;
   isolating PtNi/substrate nanoparticles by:
      sonicating the PtNi nanoparticle solution with substrate in chloroform solution,
      adding hexane to the sonicated chloroform solution, precipitating PtNi/substrate nanoparticles, and
      collecting the PtNi/substrate nanoparticles by filtration;
   annealing the PtNi/substrate nanoparticles in air at a first annealing temperature, removing surfactant from the PtNi/substrate nanoparticles;
   acid leaching the PtNi/substrate nanoparticles by:
      sonicating the collected PtNi/substrate nanoparticles in water,
      mixing an acid with the sonicated PtNi/substrate sonicated in water for 60 minutes to form leached PtNi/substrate nanoparticles, and
      collecting the leached PtNi/substrate nanoparticles by filtration; and
   annealing the leached PtNi/substrate nanoparticles at a second annealing temperature, forming a Pt-skin on the PtNi/substrate nanoparticles.

2. The method of claim 1, wherein the initial temperature is 20-24° C.

3. The method of claim 2, wherein the segment length is at least 10 mm.

4. The method of claim 2 wherein the segment length is 5-10 mm.

5. The method of claim 4, wherein the continuous flow reactor has a reactor tube diameter of 2-5 mm.

6. The method of claim 1, wherein the polar solvent comprises diphenyl ether and 1,2-dichlorobenzene.

7. The method of claim 1, wherein the substrate is carbon.

8. The method of claim 1, wherein the acid is HClO4.

9. The method of claim 1, wherein annealing the leached PtNi/substrate nanoparticles at the second annealing temperature, forming the Pt-skin on the PtNi/substrate nanoparticles, comprises heating the leached PtNi/substrate nanoparticles at 400° C. for 1 hour under flow of 3% H$_2$/Ar gas.

10. A method of forming platinum containing nanoparticles comprising:
    forming, at an initial temperature of 18-28° C., a reaction mixture comprising a nickel precursor comprising nickel acetate tetrahydrate, a reducing agent comprising 1,2-tetradecanediol, a surfactant comprising one part oleic acid to two parts oleylamine, a platinum precursor comprising platinum acetylacetonate, and a polar solvent comprising 1,2-dichlorobenzene and diphenyl ether, wherein the reaction mixture comprises a ratio of 1.336 g nickel acetate tetrahydrate to 1.04 g platinum acetylacetonate to 0.68 g 1,2-tetradecanediol to 8 mL oleylamine to 4 mL oleic acid to 24 mL 1,2-dichlorobenzene, to 160 mL diphenyl ether; and
    injecting a segment of reaction mixture into a continuous flow reactor at a temperature of at least 190° C. for 5 minutes to 1 hour, forming a platinum containing nanoparticle solution, the segment having a segment length of at least 3 mm.

11. The method of claim 10, wherein the initial temperature is 20-24° C.

12. The method of claim 10, wherein the segment length is at least 10 mm.

13. The method of claim 10 wherein the segment length is 5-10 mm.

14. The method of claim 13, wherein the continuous flow reactor has a reactor tube diameter of 2-5 mm.

15. The method of claim 6, wherein the reaction mixture comprises a ratio of 1.336 g nickel acetate tetrahydrate to 1.04 g platinum acetylacetonate to 0.68 g 1,2-tetradecanediol to 8 mL oleylamine to 4 mL oleic acid to 24 mL 1,2-dichlorobenzene, to 160 mL diphenyl ether.

16. A method of synthesizing Pt nanoparticle catalyst comprising the steps of:
    forming, at an initial temperature of 18-28° C., a reaction mixture comprising a metal precursor comprising nickel acetate tetrahydrate, a reducing agent comprising 1,2-tetradecanediol, and a surfactant comprising one part oleic acid to two parts oleylamine, a platinum precursor comprising platinum acetylacetonate, and a polar solvent;
    heating the reaction mixture at 110° C. for two hours, removing water;
    injecting a segment of reaction mixture into a continuous flow reactor at a temperature of at least 190° C. for 5 minutes to 1 hour, forming a PtNi nanoparticle solution, the segment having a segment length of at least 3 mm;
    isolating PtNi/substrate nanoparticles by:
       sonicating the PtNi nanoparticle solution with substrate in chloroform solution,
       adding hexane to the sonicated chloroform solution, precipitating PtNi/substrate nanoparticles, and
       collecting the PtNi/substrate nanoparticles by filtration;
    annealing the PtNi/substrate nanoparticles in air at a first annealing temperature, removing surfactant from the PtNi/substrate nanoparticles;
    acid leaching the PtNi/substrate nanoparticles by:
       sonicating the collected PtNi/substrate nanoparticles in water,
       mixing an acid with the sonicated PtNi/substrate sonicated in water for 60 minutes to form leached PtNi/substrate nanoparticles, and
       collecting the leached PtNi/substrate nanoparticles by filtration; and
    annealing the leached PtNi/substrate nanoparticles at a second annealing temperature, forming a Pt-skin on the PtNi/substrate nanoparticles;
    wherein annealing the PtNi/substrate nanoparticles in air at the first annealing temperature, removing surfactant from the PtNi/substrate nanoparticles, comprises heating the PtNi/substrate nanoparticles at 185° C. for 20 hours.

\* \* \* \* \*